United States Patent
Gatti et al.

(10) Patent No.: US 9,327,557 B2
(45) Date of Patent: May 3, 2016

(54) OFF-ROAD MOTORCYCLE TYRE

(75) Inventors: Giovanni Gatti, Milan (IT); Steffen Baum, Milan (IT); Paolo Brivio, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1056 days.

(21) Appl. No.: 13/380,718

(22) PCT Filed: Jul. 2, 2010

(86) PCT No.: PCT/IB2010/001618
§ 371 (c)(1),
(2), (4) Date: May 18, 2012

(87) PCT Pub. No.: WO2011/001272
PCT Pub. Date: Jan. 6, 2011

(65) Prior Publication Data
US 2012/0267019 A1   Oct. 25, 2012

Related U.S. Application Data

(60) Provisional application No. 61/272,548, filed on Oct. 5, 2009.

(30) Foreign Application Priority Data

Jul. 3, 2009   (IT) .................................. MI09A1182

(51) Int. Cl.
| | |
|---|---|
| *B60C 9/06* | (2006.01) |
| *B60C 9/09* | (2006.01) |
| *B60C 9/22* | (2006.01) |
| *B60C 11/11* | (2006.01) |
| *B60C 15/00* | (2006.01) |

(52) U.S. Cl.
CPC . *B60C 11/11* (2013.01); *B60C 9/06* (2013.01); *B60C 9/09* (2013.01); *B60C 9/22* (2013.01); *B60C 15/0018* (2013.04); *B60C 2200/10* (2013.04); *B60C 2200/14* (2013.04)

(58) Field of Classification Search
CPC ............ B60C 9/06; B60C 9/22; B60C 11/11; B60C 9/09
See application file for complete search history.

(56) References Cited

U.S. PATENT DOCUMENTS

| | | | | |
|---|---|---|---|---|
| 5,176,770 | A * | 1/1993 | Ohkuni ......................... | 152/530 |
| 6,699,343 | B2 * | 3/2004 | Armellin et al. .............. | 156/117 |
| 2005/0173036 | A1 | 8/2005 | Rossignaud | |
| 2008/0245457 | A1 | 10/2008 | Sueishi | |

FOREIGN PATENT DOCUMENTS

| | | |
|---|---|---|
| EP | 0 461 646 A2 | 12/1991 |
| EP | 0 928 704 A1 | 7/1999 |
| JP | 04-293603 A * | 10/1992 |

OTHER PUBLICATIONS

International Search Report from the European Patent Office for International Application No. PCT/IB2010/001618, mailing date Apr. 15, 2011.

(Continued)

*Primary Examiner* — Steven D Maki
(74) *Attorney, Agent, or Firm* — Finnegan, Henderson, Farabow, Garrett & Dunner, L.L.P.

(57) ABSTRACT

A tyre for off-road motorcycles has a tread band provided with blocks, a carcass structure with crossed plies and at least one zero degree belt layer with limited angular extension, i.e., a zero degree belt layer which does not extend up to the axially outer edges of the tread band.

12 Claims, 5 Drawing Sheets

(56) References Cited

OTHER PUBLICATIONS

Anonymous; "Pocking 2002 / poso3", XP002617992, MSC Olching e.V.—Pocking 2002, 1 page, (2007).

Glockner; "German Open 2008 / 4437", XP002617993, MSC Olching e.V., 1 page, (2008).

Rosenberger; "Fahrbericht: Dirt Track-Harley 750—Schleudersitz", XP002617994, MOTORRAD, No. 7, pp. 206-209, (1981).

\* cited by examiner

OFF-ROAD MOTORCYCLE TYRE

CROSS REFERENCE TO RELATED APPLICATIONS

This application is a national phase application based on PCT/IB2010/001618, filed Jul. 2, 2010, which claims the priority of Italian Application No. MI2009A001182, filed Jul. 3, 2009, and the benefit of U.S. Provisional Application No. 61/272,548, filed Oct. 5, 2009, the content of all of which is incorporated herein by reference.

FIELD OF THE INVENTION

The present invention relates to motorcycles for "Rally-Off-Road" use and to tyres for such off-road motorcycles. In particular, the present invention relates to tyres intended for "rally-off-road" motorcycles having medium-large engine capacity (e.g. 450 cm$^3$ or more), and/or high power (e.g. 70-100 hp). Even more particularly, the present invention relates to tyres intended to be fitted on the rear wheel of such motorcycles.

PRIOR ART

The tyres intended to be fitted on motorcycles for Rally and/or Off-Road use are typically employed in extreme conditions, on a great variety of grounds other than asphalt: sandy grounds, rocky grounds, compact grounds, etc. In particular, when used for racing, the use conditions of these tyres become extremely severe, and the tyres must ensure optimal performance as regards duration, tear resistance, adherence, stability and traction on such various grounds, even at high running speeds.

Typically, in this product segment tyres provided with blocks are used, which are capable of penetrating into the ground (in particular, sandy grounds) for ensuring traction, particularly while accelerating and braking.

US 2008/0245457 describes a tyre for off-road motorcycles comprising a tread provided with a plurality of blocks comprising an axially outermost shoulder block, a pair of sidewalls and a pair of beads. The shoulder blocks comprise an outer edge corresponding to the tread band edge, and a lateral face extending from the tread band edge to a radially inner edge located on the sidewall of the tyre. The lateral face with a swelling portion swells axially outside of the tyre with respect to a reference line which connects the tread band edge and the radially inner edge, in a cross section including a tyre axis, and the radial height of the radially inner edge of the lateral face from the bead base line being in a range of from 30 to 50% of the tyre section height.

US2005/0173036 describes a tyre for motorcycles comprising a toroidal surface extending between two opposite sidewalls of the tyre and a plurality of blocks arranged onto the toroidal surface. The blocks are shaped to be ground contacting and to form an outer circumferential tread profile. At least a portion of the blocks has a cross-like structure or a T-like structure, in top view onto the toroidal surface.

SUMMARY OF THE INVENTION

The Applicant has observed that this kind of tyres, notwithstanding the use of particular blocks, often undergoes almost irreparable damages, especially when used for racing. In particular, it is not uncommon that very detachments of blocks from the tread occur, most probably caused by a worsening due to thermal causes of the compounds used in the tread.

For solving this problem, the Applicant has analyzed some specific issues of these tyres, caused by the particular way of driving the motorcycles on which they are fitted.

The users of such motorcycles, due to the variability of grounds which they have to run on (possibly at high speed, for example during an off-road race), to the center of gravity of the motorcycles moved much upwards and to the considerable weight of the motorcycles themselves, cannot take a bend in full lean as if on an common motorbike suitable for use on road paths and/or on asphalt tracks. In order not to fall down, they must instead maintain the motorcycle at an inclination angle with respect to the vertical to the ground of 25-30° at most.

Figure 5:
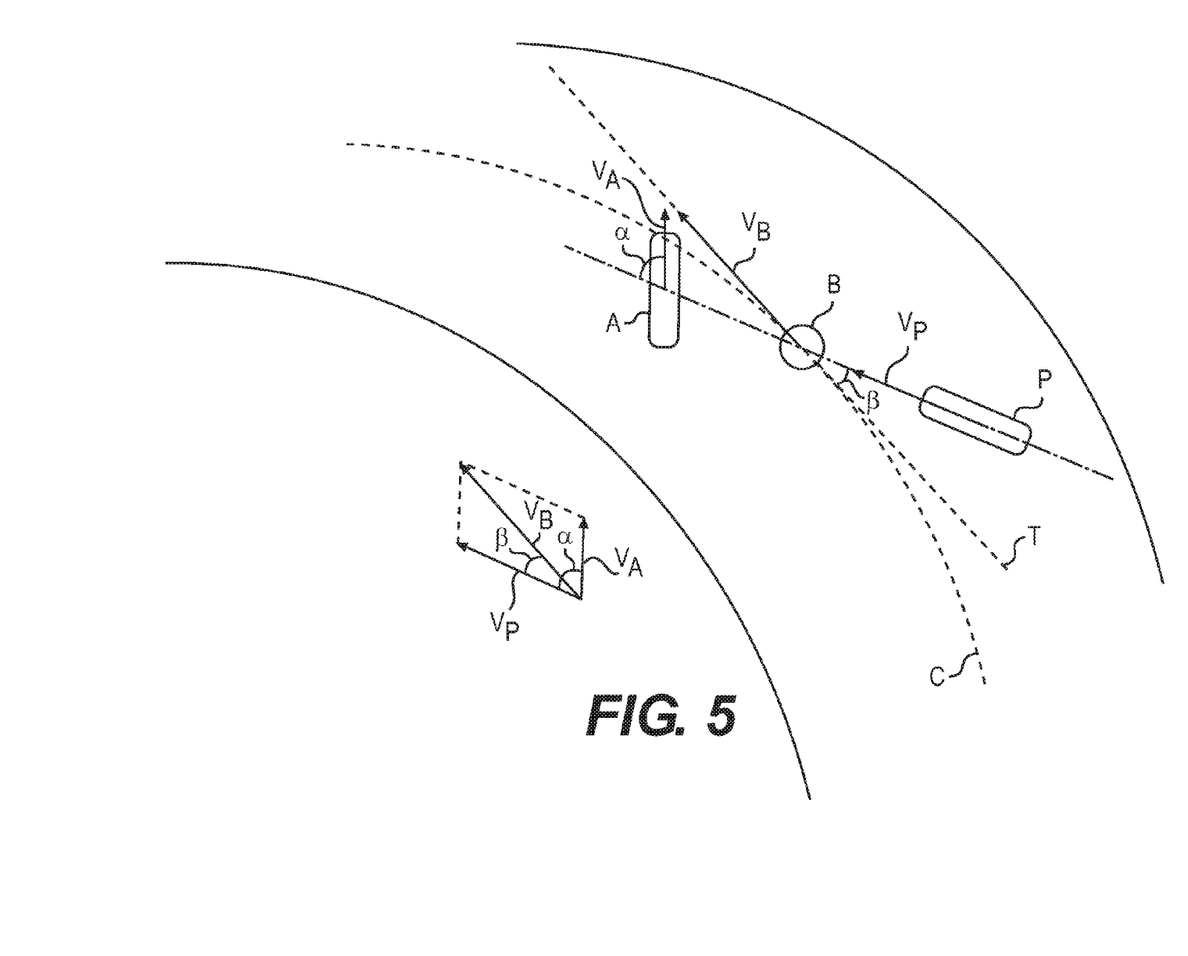
FIG. 5 schematically shows a motorcycle for rally/off-road use while running on a bend.

For this kind of motorcycles, the driving position taken while driving on a bend is therefore very different from that common in a motorcycle for road use. In particular, as shown in the simplified diagram of FIG. 5, while driving on a bend C, especially at high speed, the longitudinal axis of the motorcycle (represented by vector $v_P$ in FIG. 5) is "pointed" towards the inside of the bend C, thus forming an angle □ with respect to the tangent T to the trajectory itself, according to a so-called "oversteering" scheme. In these conditions, the driver accelerates so as to provide a traction thrust at the rear wheel of the motorcycle. At the same time, in order to keep the motorcycle on the bend trajectory, the front wheel A (represented by vector $v_A$ in FIG. 5) is turned about the steer axis in a direction opposite to the trajectory curvature, according to a "countersteering" scheme, by an angle □ with respect to the oversteer direction. In this way, the center of gravity B of the motorcycle (represented by vector $v_B$ in FIG. 5) can move along the right bend trajectory.

The combined effect of the traction thrust provided by the rear wheel in oversteer and of the countersteer imposed to the front wheel thus allows the motorcycle to compensate the lateral drift and to run on the bend. This behavior is very different from that of a motorcycle for road use, where for running on a bend both the front wheel and the rear wheel are placed substantially parallel to the tangent to the bend trajectory, exploiting very high camber angles and the tyre reaction to lateral thrusts.

The Applicant has therefore observed that, in order to sustain in an optimal manner this way of running on a bend, the tyres fitted on the motorcycle, and particularly the rear tyre, shall be able to combine very different and contrasting features:

- on the one hand, it appears to be necessary a considerable structure stiffness, in order to be able to ensure the traction thrust required to run on a bend and to keep as far as possible constant the tyre profile under the action of the centrifugal force arising during high speed rotation of the rear wheel while running in oversteer and/or on a straight path at high speed;
- on the other hand, it appears to be necessary a as far as possible adaptive structure, both while setting for the correct bend trajectory, when a too stiff behavior of the tyre would make the motorcycle uncontrollable, and for ensuring optimal performances on grounds extremely different from one another and absorbing bumps/unevenness of the ground, particularly on off-road grounds with low compactness (e.g. on sand and/or dirt roads).

The Applicant has found that the above-mentioned reciprocally contrasting problems are solved by means of tyre for off-road motorcycles having a tread band provided with blocks, a carcass structure with crossed plies and at least one zero degrees belt layer with limited angular extension, i.e. a zero degrees belt layer which does not extend up to the axially outer edges of the tread band.

In a first aspect thereof, the invention relates to a method for controlling a motorcycle comprising a first tyre fitted on a rear wheel and a second tyre fitted on a front wheel, said first tyre and said second tyre comprising:

a reinforcing structure comprising at least two radially superimposed carcass plies, each of said plies comprising reinforcing cords substantially parallel with each other, oriented according to inclined directions with respect to an equatorial plane of said first and second tyre and opposed to the reinforcing cords of the radially adjacent ply;

a tread band comprising a plurality of blocks being circumferentially spaced by transverse grooves;

said method comprising:

engaging with said motorcycle a bending trajectory;

orienting said motorcycle according to an oversteer angle with respect to said bending trajectory, and orienting said front wheel according to a countersteer angle with respect to said bending trajectory;

providing an accelerating torque to said rear wheel in at least a portion of said bending trajectory, while said rear wheel is disposed according to said oversteer angle;

wherein said reinforcing structure and said blocks of said first tyre react to said accelerating torque so as to provide said rear wheel with a traction thrust directed according to said oversteer angle;

said reinforcing structure and said blocks of said second tyre react to said countersteer angle so as to compensate a lateral drift of said motorcycle and said oversteer angle, and keep said motorcycle on the bending trajectory;

and wherein said reinforcing structure of said first tyre further comprises at least one belt layer disposed between said at least two carcass plies and said tread band, said belt layer comprising at least one reinforcing cord disposed to form a plurality of windings disposed according to a substantially null angle with respect to the equatorial plane of said first tyre, said reinforcing layer extending only on a central sub-portion of a crown portion of said first tyre, so as to increase a stiffness of said central sub-portion of said first tyre, and consequently contribute to said traction thrust.

In a second aspect thereof, the invention relates to a motorcycle comprising a first tyre fitted on a rear wheel and a second tyre fitted on a front wheel, said first tyre and said second tyre comprising:

a reinforcing structure comprising at least two radially superimposed carcass plies, each of said plies comprising reinforcing cords substantially parallel with each other, oriented according to inclined directions with respect to an equatorial plane of said first and second tyre and opposed to the reinforcing cords of the radially adjacent ply;

a tread band comprising a plurality of blocks being circumferentially spaced by transverse grooves;

and wherein said reinforcing structure of said first tyre further comprises at least one belt layer disposed between said at least two carcass plies and said tread band, said belt layer comprising at least one reinforcing cord disposed to form a plurality of windings disposed according to a substantially null angle with respect to the equatorial plane of said first tyre, said reinforcing layer extending only on a central sub-portion of a crown portion of said first tyre.

In a third aspect thereof, the invention relates to a motorcycle tyre comprising:

a carcass structure comprising a crown portion and two lateral portions axially opposed with each other, each lateral portion being associated with a respective bead structure;

a belt structure applied in a radially outer position with respect to the carcass structure;

a tread band applied in a radially outer position with respect to the belt structure;

wherein said carcass structure comprises at least two radially superimposed carcass plies comprising, in each ply, reinforcing cords substantially parallel with each other, oriented according to inclined directions with respect to an equatorial plane of the tyre and opposed to the reinforcing cords of the radially adjacent ply;

said belt structure comprises at least one belt layer comprising at least one reinforcing cord disposed so as to form a plurality of windings disposed according to a substantially null angle with respect to the equatorial plane of the tyre, wherein said at least one belt layer extends at most on the 70% of the lateral development of said crown portion of said carcass structure;

said tread band comprises a plurality of blocks being circumferentially spaced by transverse grooves.

In particular, the tyre has higher stiffness at the equatorial plane and in the crown central sub-portion, where stability and traction thrust are required while running on straight paths or while running on a bend with drift. The tyre has instead lower stiffness at the shoulder portions for keeping the tyre footprint area as far as possible constant, independently of the kind of ground, and keeping a good ability to effectively dampen perturbations transmitted by possible ground unevenness when the motorcycle is slightly inclined, in particular while setting up for a bend.

In the shoulder portion, the lower stiffness of the tyre further ensures higher adaptability of the same to the ground.

Advantageously, it has been further observed that the presence in the belt structure of the rear tyre of at least one layer provided with zero degrees cords with limited angular extension in cooperation with a carcass structure with crossed plies allows also an increase of the motorcycle directional stability to be achieved, which is a very important parameter when running on a straight path, particularly at high speed.

It has further been observed a reduction of stresses caused by the sliding of the tyre on the ground, as well as a reduction of stresses caused by hysteresis dissipation in the compound of the tread band, with a substantial reduction of the tyre overheating. The Applicant believes that this result can be at least partially due the contrasting action exerted by the layer provided with cords arranged at zero degrees against the centrifugal force which arises while running, so as to provide the tyre with dimensional stability also while running at high speed.

For the purposes of the present invention, with the term "block" it is meant a tread band portion delimited by consecutive portions of grooves, hollows or channels or by edges of the tread band, both in radial direction and in circumferential direction, and having length, width and height comparable to one another. With the expression "comparable to one another" referred to length, width and height of the block it is meant that the maximum dimension is at most equal to 10 times the minimum dimension.

Within the present definition also falls the case in which the hollow or groove portion delimiting the block is interrupted, i.e. it has a portion with an appreciable depth reduction usually known as "tie-in", typically with an extension less than or equal to the extension of the portion or of the groove considered.

For the purposes of the present invention, with "crown portion" of the carcass structure of a tyre it is meant the radially outer portion of the carcass structure corresponding to the tread band. For indicating purposes, the extension of the lateral development of the crown portion of the carcass structure can be defined by the intersection of segments perpendicular to the tread band starting from the radially outer edges of the tread band itself and the radially outer surface of the carcass structure.

For the purposes of the present invention, with "channel" it is intended a groove or hollow with a pronounced width.

The present invention, in one or more preferred aspects, may comprise one or more of the features hereinafter presented.

Preferably, said at least one belt layer extends substantially symmetrically with respect to said equatorial plane of the tyre.

Preferably, said at least one belt layer extends at most on the 60% of the lateral development of the crown portion of said carcass.

Preferably, said at least one belt layer extends at least on the 10% of the lateral development of the crown portion of said carcass, more preferably on at least the 20%.

Preferably, at least some of the blocks of the tread band are arranged in transverse rows.

In a particular preferred embodiment, the transverse rows of blocks comprise two central block (arranged in a central area of the tread band) and two lateral blocks (arranged in a shoulder area of the tread band). Each lateral block is separated from a central block by a longitudinal groove.

Advantageously, the central blocks are separated from each other by a longitudinal groove. In a preferred embodiment, such a longitudinal groove has maximum width comprised between 3 and 8 mm.

Preferably, the belt layer extends at most up to a crown portion of the carcass structure corresponding to about 30% of the extension of a block arranged in an axially outermost position.

Preferably, the tread band has a land/sea ratio at least equal to 50%.

For the purposes of the present invention, with "land/sea ratio" of a determined portion of the tread band of the tyre (possibly of the whole tread band) it is meant the ratio between the total surface of the grooves and/or hollows of the determined portion of the tread band of the tyre (possibly of the whole tread band) and the total surface of the determined portion of the tread band (possibly of the whole tread band).

Preferably, the reinforcing cords of the carcass plies form an angle comprised between 35° and 55° with respect to the equatorial plane of the tyre.

Preferably, the carcass structure comprises four radially superimposed carcass plies.

Advantageously, in such a carcass structure the reinforcing cords of the four carcass plies can be essentially parallel with one another in each ply and oriented according to inclined directions with respect to the equatorial plane (X-X) of the tyre in each ply and opposed to the cords of the radially adjacent ply.

According to an embodiment of the present invention, said at least one belt layer comprises metal cords.

Preferably, said metal cords are made of steel, more preferably high elongation steel.

According to an embodiment, the belt layer is formed by a plurality of windings of at least one rubberized fabric strip comprising from two to five cords.

According to an alternative embodiment, the belt layer is formed by a plurality of windings of a single cord.

The cords can be distributed in the belt layer with substantially constant density from the equatorial plane towards the axially outer ends of the belt.

Preferably, the density of said cords has a value not higher than 8 cords/cm at least in an area having prefixed width located across the equatorial plane (X-X).

BRIEF DESCRIPTION OF THE FIGURES

Further features and advantages of the present invention shall become clearer form the detailed description of a preferred, although not exclusive, embodiment of a tyre for motorcycles having a reinforcing structure according to the present invention.

The description shall be presented hereinafter with reference to the accompanying drawings, provided only for indicating and, thus, non-limiting purposes, in which.

DETAILED DESCRIPTION OF EMBODIMENTS OF THE INVENTION

Referring to the mentioned figures, a motorcycle tyre according to the present invention, in particular intended to be fitted on a rear wheel of a motorcycle with high weight and medium-large engine capacity of the so-called "Rally off-road" type, has been globally indicated at 100.

Figure 1:
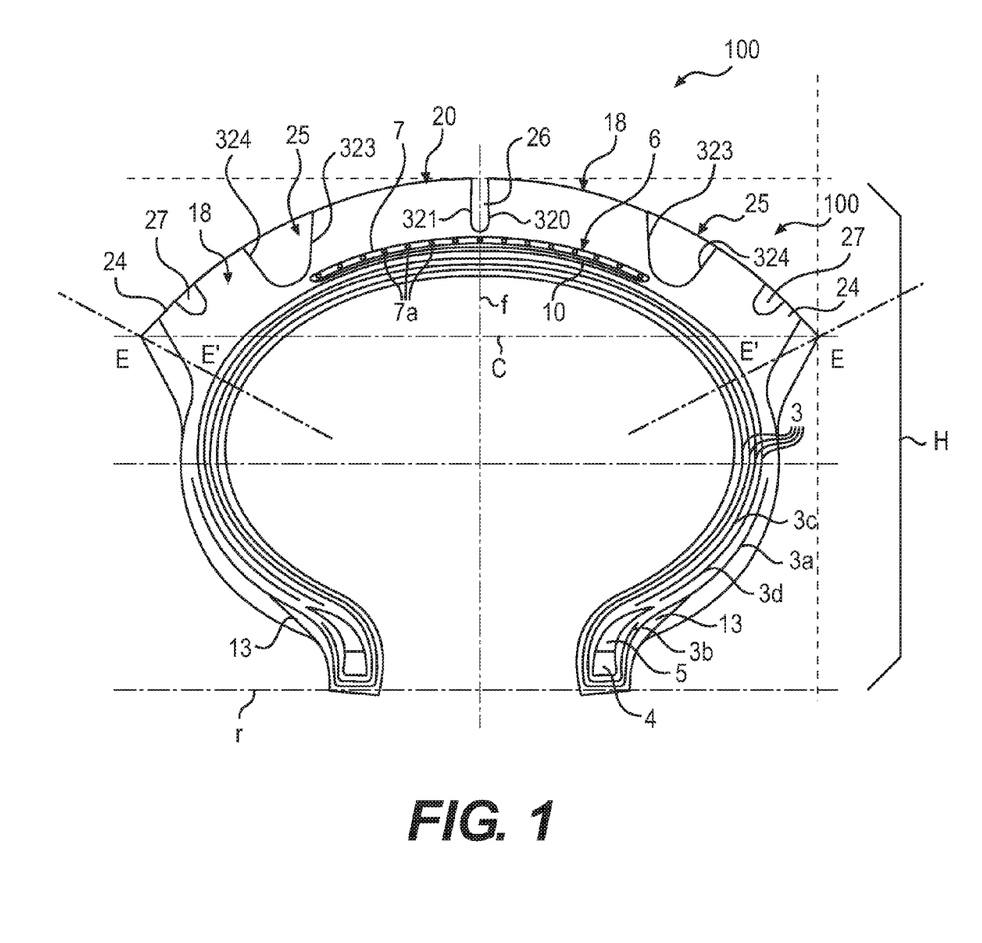
FIG. 1 is a radial cross section taken along a plane radial to the rotation axis of a tyre for rally off-road motorcycles according to the present invention.

In particular the tyre 100 has a cross section height H measured, in the equatorial plane, between the top of the tread band and the fitting diameter, identified by the reference line r, passing through the tyre beads.

The tyre 100 further has maximum width (or chord) C defined by the distance between the axially outermost points of the tyre itself. In the example shown in FIG. 1, the width C is defined by the distance between the laterally opposite ends E of the tread itself.

The tyre has a curvature defined by the specific value of the ratio between the distance f of the top of the external tread profile from the line passing through the axial ends E of the tread itself, measured in the equatorial plane of the tyre, and the above-mentioned width C. The axial ends E of the tread can be formed with an edge.

The motorcycle tyres suitable for an off-road use do not have particularly high curvatures. Typically, in this kind of tyres the curvature ratio f/C is less than or equal to about 0.3.

As to the sidewalls, the invention is preferably applied to tyres with relatively high sidewalls (FIG. 1). Typically, in this kind of tyres the sidewall height ratio (H-f)/H is equal to at least about 0.5.

The motorcycle tyre 100 comprises a reinforcing structure comprising a carcass structure 3 formed by at least two carcass plies. The carcass structure 3 comprises a crown portion and two lateral portions axially opposed with each other. Each lateral portion is associated with a respective bead structure, described below. For indicating purposes, the crown portion can be identified in FIG. 1 between the points E' defined by the lines perpendicular to the carcass structure 3 and passing through the axial ends E of the tread band.

In the embodiment of FIG. 1, the carcass structure 3 is formed by four carcass plies 3a, 3b, 3c, 3d radially superimposed to one another.

Figure 2:
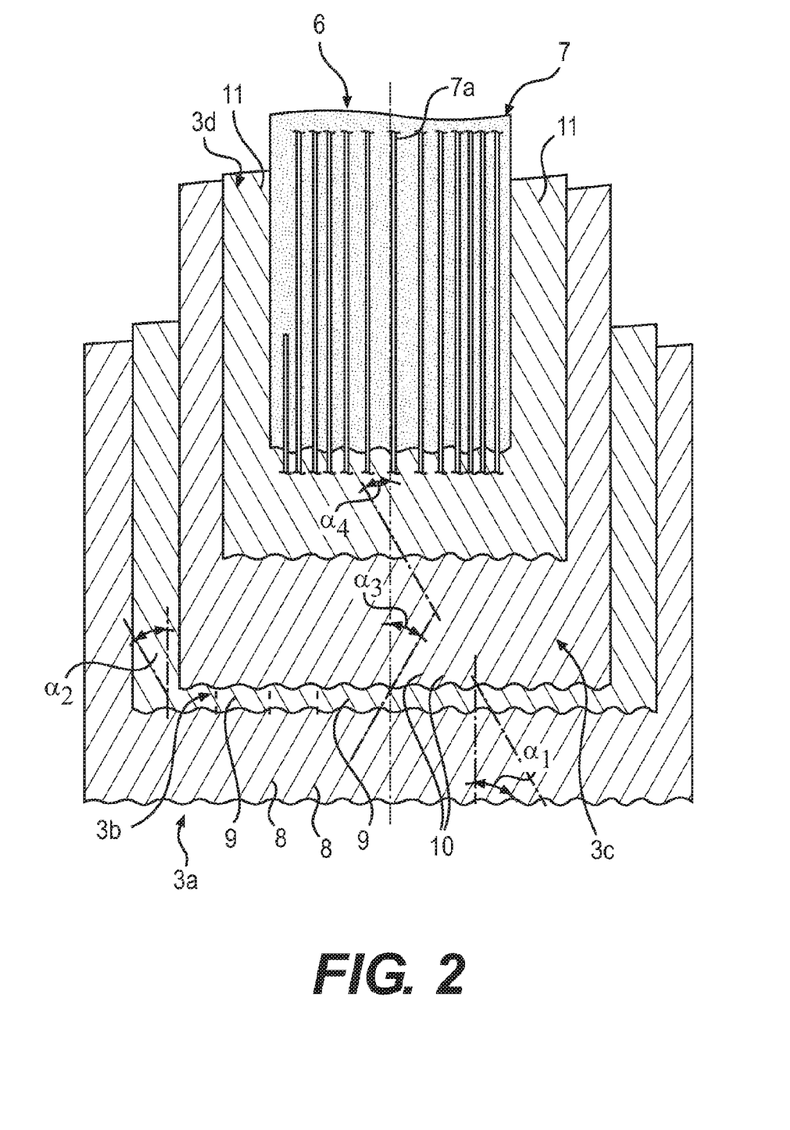
FIG. 2 shows a schematic and simplified top view of some portions of the carcass structure and of the belt structure of the tyre of FIG. 1.

Each ply 3a, 3b, 3c, 3d essentially consists of a sheet of elastomeric material incorporating a plurality of reinforcing cords 8, 9, 10, 11 (FIG. 2).

Advantageously, such reinforcing cords 8, 9, 10, 11 are essentially parallel with one another in each ply, oriented according to inclined directions with respect to the equatorial plane X-X of the tyre 100 and opposed to the cords of the radially adjacent ply.

The reinforcing cords 8 of the radially innermost carcass ply 3a can be made from textile fibers, for example nylon, rayon or PEN fibers, and form an angle $\alpha 1$ with respect to the equatorial plane X-X of the tyre 100 preferably comprised between 35° and 55°, for example equal to about 50°.

The reinforcing cords 9 of the carcass ply 3b radially adjacent to the ply 3a in the outward direction can be made from textile fibers, for example nylon, rayon or PEN fibers, and are oriented in a direction opposed with respect to the cords 8 of the radially innermost ply 3a, forming an angle $\alpha 2$ with respect to the equatorial plane X-X of the tyre 100, preferably comprised between 35° and 55°, for example equal to about 50°.

The reinforcing cords 10 of the carcass ply 3c radially adjacent to the ply 3b in the outward direction can be made from textile fibers, for example nylon, rayon or PEN fibers, and are oriented in a direction opposed with respect to the cords 9 of the radially innermost ply 3b, forming an angle $\alpha 3$ with respect to the equatorial plane X-X of the tyre 100 preferably comprised between 35° and 55°, for example equal to about 50°.

The reinforcing cords 11 of the radially outermost carcass ply 3d can be made from textile fibers, for example nylon, rayon or PEN fibers, and are oriented in a direction opposed with respect to the cords 10 of the radially innermost ply 3c, forming an angle $\alpha 4$ with respect to the equatorial plane X-X of the tyre 100 preferably comprised between 35° and 55°, for example equal to about 50°.

At least some of the carcass plies 3a, 3b, 3c, 3d are engaged, by means of their circumferentially opposite edges, with at least one annular reinforcing structure in the bead region of the tyre 100.

In particular, the opposite lateral edges of the carcass plies 3a and 3b are turned up about annular reinforcing structures called bead rings 4, while the opposite lateral edges of the carcass plies 3c and 3d are terminated before reaching such bead rings 4.

In the preferred embodiment of FIG. 1, the opposite lateral edges of the carcass plies 3a turned up about annular reinforcing structures extend on more than 40% of the height of the sidewall of the tyre 100.

In order to increase the structural homogeneity of the tyre 100, the carcass plies 3a, 3b, 3c, 3d have an extension of their axial development different from one another.

A tapered elastomeric filling 5 taking up the space defined by the plies turn-up is applied to the radially outer perimeter edge of the bead rings 4.

The region of the tyre comprising the bead ring 4 and the elastomeric filling 5 form the so-called bead, intended for anchoring the tyre to a corresponding fitting rim, not shown.

In an alternative embodiment not shown, the carcass ply has its opposite lateral edges interposed without turn-up to a plurality of annular reinforcing structures axially in a side-by-side relationship with one another, each provided with rows of annular windings radially superimposed with one another. A filling made of elastomeric material can be placed between the axially in a side-by-side relationship rows of annular windings.

Furthermore, the bead region comprises a strip 13 made of an anti-abrasive elastomeric material, in an axially outer position with respect to the turned up lateral edges of the carcass plies.

A belt structure 6 is circumferentially applied, in a radially outer position, on the carcass structure 3. The tread band 18 is circumferentially superimposed on the belt structure 6. On the tread band 18, further to a molding operation carried out upon curing the tyre, are typically formed blocks, separated from one another by longitudinal and/or transverse hollows, grooves and/or channels, arranged so as to define a desired tread pattern.

The tyre 100 further comprises a pair of sidewalls laterally applied on opposite sides to said carcass structure 3.

The carcass structure 3 is further typically lined on its inner wall with a sealing layer, also called "liner", essentially consisting of a layer made of an airproof elastomeric material, adapted to ensure the tight seal of the tyre itself after it has been inflated.

The composition of the tread band 18 is such that the band has a single compound on its radially outer surface.

The tread band 18 comprises a plurality of blocks projecting from its radially innermost surface. The transverse and/or longitudinal grooves and/or hollows defining the blocks of the tread band 18 preferably (even if not all of them necessarily) have a depth of at least 7 mm. According to a preferred embodiment of the present invention, shown also in FIGS. 3 and 4, the tread band 18 comprises rows 20 of transverse blocks circumferentially spaced apart by transverse channels 21.

Figure 3:
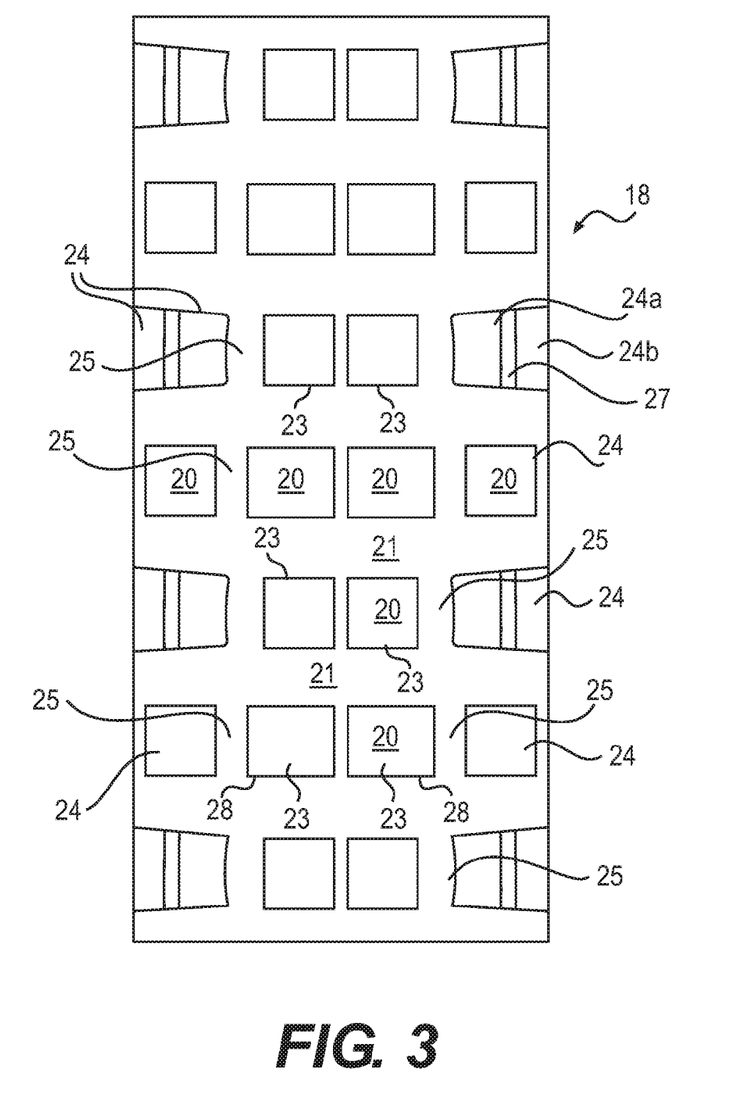
FIG. 3 schematically shows a top view of a tread band portion of the tyre according to the invention.
Figure 4:
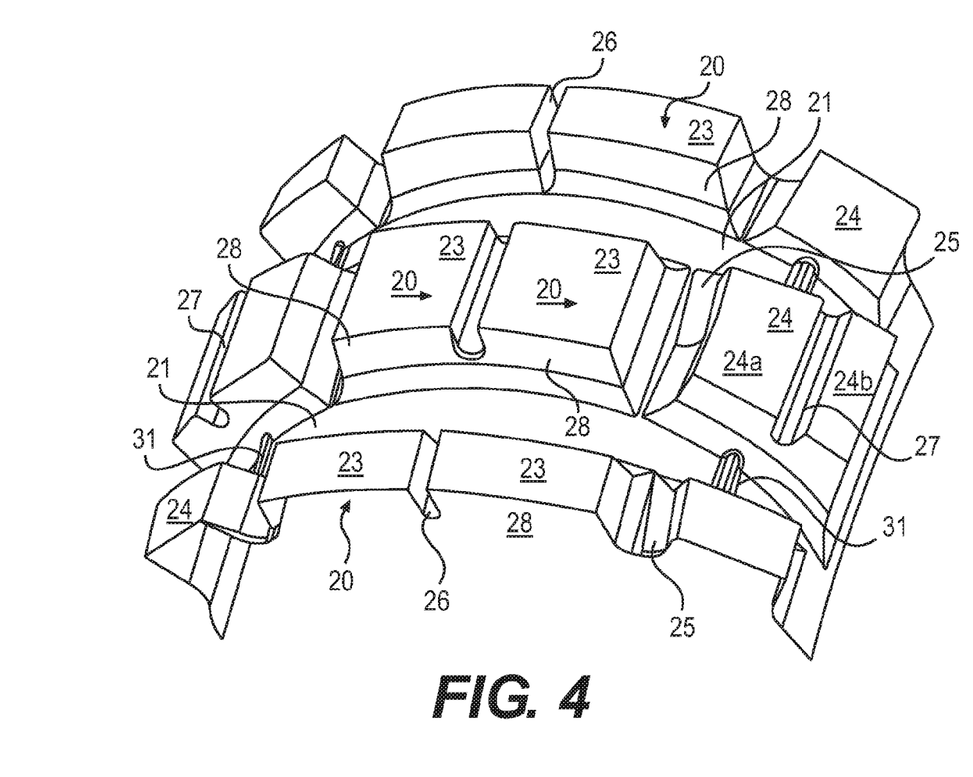
FIG. 4 schematically shows a perspective view of a tread band portion of the tyre according to the present invention.

Preferably, each transverse channel 21 has a substantially constant width comprised in the range between 20 and 50 mm.

Preferably, each transverse channel 21 has a depth (not necessarily constant) comprised in the range between 7 mm and 20 mm, preferably between 8.5 mm and 16 mm.

In the embodiment shown in FIGS. 3 and 4, each row 20 of blocks preferably has four large blocks extending transversally over the tread band from one edge to the other. Preferably, each row 20 of blocks has two central blocks 23 and two lateral blocks 24.

Each lateral block 24 is separated from an adjacent central block 23 by a longitudinal channel 25. The longitudinal channel 25 may preferably have a width comprised between 15 and 35 mm, for example 27 mm.

Preferably, each longitudinal channel 25 has a depth comprised in the range between 8 mm and 12 mm, preferably from 8.5 mm and 10 mm.

Each block of the rows 20 has at least one lateral face 28 facing the transverse channel 21 and contributing to circumferentially define the same.

In order to increase the traction effect, the blocks of each row 20 are substantially aligned to one another in axial direction, so that the lateral faces 28 facing the transverse channel 21 of the blocks of a same row, particularly of the central blocks 23, lie substantially on a same plane.

In practice, the wall formed together by the lateral faces 28 of the blocks of the same row acts on the ground like a shovel. In particular, the row 20 of blocks penetrates into the ground while the above-mentioned wall thrusts against the ground generating a traction in the different use conditions of the tyre, such as for example on a yielding and/or wet ground.

In order, instead, to increase the resistance of the central blocks 23 to lateral stresses, the lateral walls of the longitudinal channels 25 have a different inclination with respect to their mid-line.

As shown for example in FIG. 1, the axially inner lateral wall 323 of the longitudinal channel 25 has an inclination, with respect to the mid-line of the longitudinal channel 25 itself, which is larger than the inclination of the opposite, axially outer, wall 324.

As an example, the lateral wall 323 may have an inclination of about 35° with respect to its mid-line, while the opposite wall 324 may have an inclination of about 5° with respect to the mid-line of the same longitudinal channel 25.

The central blocks 23 are separated from one another by a longitudinal groove 26 substantially arranged along the equatorial plane X-X.

The longitudinal groove 26 preferably has a width comprised in the range between 3 and 8 mm and a depth between 6 and 9 mm, for example 7 mm.

The lateral walls 320, 321 of the longitudinal groove 26 may have the same inclination with respect to their mid-line, for example equal to 4°.

Each lateral block 24 may have a longitudinal groove 27 with reduced depth adapted to divide each block into two sub-blocks 24*a*, 24*b*.

For this purpose, the longitudinal groove 27 has a depth less than 7 mm and a width less than 8 mm.

In the embodiment shown in FIG. 4, the lateral blocks 24 are connected with one another by a further element 31 arranged transversally to the transverse channel 21.

The reinforcing structure of the tyre 100 comprises also a belt structure 6. The belt structure 6 comprises at least one layer 7 having a plurality of circumferential windings arranged axially in a side-by-side relationship, formed by a rubberized cord 7*a* or by a strip comprising a number of rubberized cords 7*a* (preferably from two to five), spirally wound at a substantially null angle (typically between 0° and 5°) with respect to the equatorial plane X-X of the tyre.

The belt structure 6 extends on a central sub-portion of the crown portion of the tyre, i.e. of the carcass structure 3. Preferably, the belt structure 6 extends at most on the 60-70% of the lateral development of the crown portion of the carcass structure 3. Such crown portion is identified in FIG. 1 between the points E' of projection of the axially outer edges E of the tread band 18 on the radially outer surface of the carcass structure 3.

Preferably, the belt structure 6 extends at least on the 10% of the lateral development of the crown portion of the carcass structure 3, more preferably on at least the 20%.

Preferably, the belt structure 6 extends substantially symmetrically across the equatorial plane.

In the embodiment shown in the figures, the belt structure 6 extends under the central blocks 23 up to reaching the transverse channels 25. However, the belt structure 6 might have a larger or smaller extension depending on the specific application.

Preferably, the belt structure 6 extends at most up to reaching the 30% of the axially outermost lateral blocks 24 of the tread band 18.

The cords 7*a* of the belt structure 6 are metal cords. Preferably, said cords 7*a* are metal cords made of steel of the high elongation (HE) type. Such cords are described for example in the European patent EP 0.461.646 to the same Applicant, to which reference is made for further details. In particular, such high elongation (HE) cords have a load-elongation diagram comprising a curvilinear portion arranged between two substantially straight portions having different inclination with respect to the axes of the diagram.

Very briefly, the cords 7*a* may, for example, consist of a number of strands, from one to five, preferably between three and four, each strand consisting of a number of base metal filaments, from two to ten, preferably between four and seven. The base filaments typically have a diameter larger than 0.10 mm, preferably comprised between 0.12 and 0.35 mm. The filaments in the strands and the strands in the cord are helically wound together, preferably in the same direction, with equal, or even different, winding pitch for the wires and the strands.

Preferably, such cords 7*a* are formed with steel wires having a carbon content higher than or equal to 0.7%. In particular, in a specific prototype made by the Applicant the helical winding of the layer 6 consists of a single cord 7*a*, known as 3×3×0.20 HE HT, spiraled from one end to the other of the belt. The above-mentioned denomination defines an equivrse metal cord formed by three strands, each consisting of three base wires with a diameter equal to 0.20 mm; the acronym HE means "high elongation"; the acronym HT indicates "high tensile" steel, i.e. steel with high carbon content (about 0.8%).

The high elongation (HE) cords herein referred to have an ultimate elongation of at least 4%, preferably comprised between 4% and 8%.

In a particularly preferred embodiment the belt structure 6 comprises a single layer 7 of cords 7*a* disposed according to a substantially null angle with respect to the equatorial plane X-X.

The cords 7*a* of the layer 7 are preferably distributed with substantially constant density from the equatorial plane (X-X) towards the axially outer ends of the belt structure 6.

Preferably, the density of the above-mentioned cords 7*a* has a value not higher than 8 cords/cm at least in an area having prefixed width located across the equatorial plane (X-X).

The tyre 100 may also comprise a layer 10 of elastomeric material disposed between said carcass structure 2 and said belt structure 6 formed by said circumferential windings, said layer 10 preferably extending on a surface substantially corresponding to the development surface of said belt structure 6. Alternatively, said layer 10 extends on a surface larger than the development surface of the belt structure 6.

In a preferred embodiment, said layer 10 comprises short aramidic fibers, for example made of Kevlar®, dispersed in said elastomeric material.

In a further embodiment, the tread band 18 is realized according to a "cap and base" scheme, and comprises a radially outermost portion superimposed to an underlayer made of elastomeric material (not shown in FIG. 1). The underlayer is superimposed to the belt structure 6, and preferably extends on a surface substantially corresponding to the development surface of the radially outer portion of the tread band. Alternatively, said underlayer extends only on a portion of the development of the radially outer portion of the tread band, for example on laterally opposite portions thereof.

Advantageously, in a pair made of a front tyre and a rear tyre intended for rally/off-road use the belt layer or layers 7 are provided only on the tyre intended for the rear wheel of the motorcycle.

In a particularly preferred embodiment, the hollow space formed between the tyre and the rim, particularly in the rear wheel, is substantially filled with a ring of foamy elastomeric material (in the jargon called "mousse").

The drive results obtained comparing two tyre sets fitted on the wheels of a motorcycle (KTM 690) are reported below in table 1.

The two sets differ only in rear tyre. In particular, the second set has a tyre according to the invention with size 140/80-18, while the first set has rear tyre with the same size, without belt layers between carcass structure and tread band.

In table 1 the assessments obtained from the tyre according to the invention as compared with the comparison tyre are reported for six parameters: behavior predictability, controllability, promptness, traction-braking, trajectory holding on a bend, overall stability. In table 1, the assessment for the comparison tyre is expressed by means of a reference parameter, for the sake of simplicity called "ref" for all the assessed performances (but not necessarily the same in absolute value for all the assessed performances). The assessment of the tyre according to the invention expresses the variation of any assessed performance as compared with the "ref" assessment.

TABLE 1

|  | 1st Set (comparison) | 2nd Set (invention) |
| --- | --- | --- |
| Behavior predictability | ref | ref + 2 |
| Controllability | ref | ref + 1.5 |
| Promptness | ref | ref + 0.5 |
| Traction-Braking | ref | ref + 1.7 |
| Trajectory holding on a bend | ref | ref + 0.7 |
| Overall stability | ref | ref + 1 |

The tyre according to the invention has a better global performance than the comparison tyre as regards all the assessed features.

Behavior predictability, controllability, promptness and trajectory holding are very important features as regards the tyre behavior on off-road grounds, both while accelerating on leaving a bend and while skidding on entering and on running along the same.

Advantageously, the contribution provided by the different structure stiffness due to the use of a carcass structure with crossed plies and a zero degrees belt with limited extension allows the tyre weight not to be significantly increased, thus achieving all the related advantages as regards the reduction of the inertia effects caused by the non-suspended mass.

The general stability is instead a very good indicator of the tyre ability to dampen oscillations when running on a straight path.

In other words, the set with the rear tyre according to the invention ensures a better behavior in the stability region than the reference set.

In particular, the rear tyre according to the invention ensures a suitable structural compactness both vertically and laterally, without compromising the ability of absorbing vibrations or road surface unevenness and thus negative steering sensitivities in terms of oscillation dampening/containment.

The present invention has been described with reference to some embodiments thereof. Many modifications can be made in the embodiments described in detail, still remaining within the scope of protection of the invention, defined by the following claims.

The invention claimed is:

1. A motorcycle tyre comprising:
   a carcass structure comprising a crown portion and two lateral portions axially opposed to each other, each lateral portion being associated with a respective bead structure;
   a belt structure applied in a radially outer position with respect to the carcass structure; and
   a tread band applied in a radially outer position with respect to the belt structure,
   wherein:
   said carcass structure comprises at least two radially superimposed carcass plies comprising, in each ply, reinforcing cords substantially parallel with each other, oriented according to inclined directions with respect to an equatorial plane of the tyre and opposed to the reinforcing cords of the radially adjacent ply;
   said belt structure comprises at least one belt layer comprising at least one reinforcing cord disposed so as to form a plurality of windings disposed according to a substantially null angle with respect to the equatorial plane of the tyre, wherein said at least one belt layer extends at most on 70% of a lateral development of said crown portion of said carcass structure; and
   said tread band comprises a plurality of blocks circumferentially spaced by transverse grooves;
   wherein said plurality of blocks comprises two central blocks and two axially outer blocks, each axially outer block being separated from a central block by a longitudinal groove;
   wherein the two central blocks are separated by a longitudinal groove having a maximum width between 3 and 8 mm; and
   wherein the belt layer extends at most up to a crown portion of the carcass structure corresponding to about 30% of an extension of an axially outer block.

2. The tyre according to claim 1, wherein said belt layer extends at most on 60% of the lateral development of said crown portion of said carcass structure.

3. The tyre according to claim 1, wherein the tread band has a land/sea ratio at least equal to 50%.

4. The tyre according to claim 1, wherein said carcass structure comprises four radially superimposed carcass plies.

5. The tyre according to claim 1, wherein said reinforcing cords of said carcass plies form an angle between 35° and 55° with respect to the equatorial plane of the tyre.

6. The tyre according to claim 1, wherein reinforcing cords of said belt structure are high elongation steel cords.

7. The tyre according to claim 1, wherein the belt structure is formed by a plurality of windings of a rubberized fabric strip comprising from two to five reinforcing cords.

8. The tyre according to claim 1, wherein said belt structure is formed by a plurality of windings of a single reinforcing cord.

9. The tyre according to claim 1, wherein said reinforcing cords of said belt structure are distributed with substantially constant density from the equatorial plane toward axially outer ends of the belt structure.

10. The tyre according to claim 9, wherein the density of said reinforcing cords of said belt structure has a value not higher than 8 cords/cm at least in an area having prefixed width located across the equatorial plane.

11. A motorcycle comprising a first tyre fitted on a rear wheel and a second tyre fitted on a front wheel, said first tyre and said second tyre comprising:

a reinforcing structure comprising at least two radially superimposed carcass plies, each of said plies comprising reinforcing cords substantially parallel with each other, oriented according to inclined directions with respect to an equatorial plane of said first and second tyre and opposed to the reinforcing cords of a radially adjacent ply; and a tread band comprising a plurality of blocks circumferentially spaced by transverse grooves, wherein said reinforcing structure of said first tyre further comprises at least one belt layer disposed between said at least two carcass plies and said tread band, said belt layer comprising at least one reinforcing cord disposed to form a plurality of windings disposed according to a substantially null angle with respect to the equatorial plane of said first tyre, said reinforcing layer extending only on a central sub-portion of a crown portion of said first tyre, wherein said plurality of blocks comprises two central blocks and two axially outer blocks, each axially outer block being separated from a central block by a longitudinal groove, wherein the two central blocks are separated by a longitudinal groove having a maximum width between 3 and 8 mm, and wherein the belt layer extends at most up to a crown portion of the carcass structure corresponding to about 30% of the extension of an axially outer block.

12. A method for controlling a motorcycle comprising a first tyre fitted on a rear wheel and a second tyre fitted on front wheel, said first tyre and said second tyre comprising:

a reinforcing structure comprising at least two radially superimposed carcass plies, each of said plies comprising reinforcing cords substantially parallel with each other, oriented according to inclined directions with respect to an equatorial plane of said first and second tyre and opposed to the reinforcing cords of a radially adjacent ply; and a tread band comprising a plurality of blocks circumferentially spaced by transverse grooves;

said method comprising:

engaging with said motorcycle a bending trajectory;

orienting said motorcycle according to an oversteer angle with respect to said bending trajectory, and orienting said front wheel according to a countersteer angle with respect to said bending trajectory; and providing an accelerating torque to said rear wheel in at least a portion of said bending trajectory, while said motorcycle is disposed according to said oversteer angle, wherein:

said reinforcing structure and said blocks of said first tyre react to said accelerating torque so as to provide said rear wheel with a traction thrust directed according to said oversteer angle;

said reinforcing structure and said blocks of said second tyre react to said countersteer angle so as to compensate a lateral drift of said motorcycle and said oversteer angle, and keep said motorcycle on the bending trajectory; and said reinforcing structure of said first tyre further comprises at least one belt layer disposed between said at least two carcass plies and said tread band, said belt layer comprising at least one reinforcing cord disposed to form a plurality of windings disposed according to a substantially null angle with respect to the equatorial plane of said first tyre, said reinforcing layer extending only on a central sub-portion of a crown portion of said first tyre, so as to increase a stiffness of said central sub-portion of said first tyre, and consequently contribute to said traction thrust;

wherein said plurality of blocks comprises two central blocks and two axially outer blocks, each axially outer block being separated from a central block by a longitudinal groove;

wherein the two central blocks are separated by a longitudinal groove having a maximum width between 3 and 8 mm; and wherein the belt layer extends at most up to a crown portion of the carcass structure corresponding to about 30% of the extension of an axially outer block.

* * * * *